United States Patent
Staeck

(10) Patent No.: US 11,489,177 B2
(45) Date of Patent: Nov. 1, 2022

(54) HUMIDIFIER AND MOTOR VEHICLE WITH A FUEL CELL DEVICE HAVING A HUMIDIFIER

(71) Applicants: AUDI AG, Ingolstadt (DE); Volkswagen AG, Wolfsburg (DE)

(72) Inventor: Rune Staeck, Gifhorn (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 16/972,498

(22) PCT Filed: Jun. 4, 2019

(86) PCT No.: PCT/EP2019/064442
§ 371 (c)(1),
(2) Date: Dec. 4, 2020

(87) PCT Pub. No.: WO2019/233988
PCT Pub. Date: Dec. 12, 2019

(65) Prior Publication Data
US 2021/0273245 A1    Sep. 2, 2021

(30) Foreign Application Priority Data

Jun. 7, 2018 (DE) .................. 10 2018 208 984.1
Aug. 17, 2018 (DE) .................. 10 2018 213 916.4

(51) Int. Cl.
*H01M 8/04119* (2016.01)
*H01M 8/04828* (2016.01)
*B01D 63/08* (2006.01)

(52) U.S. Cl.
CPC ... *H01M 8/04149* (2013.01); *H01M 8/04141* (2013.01); *B01D 63/082* (2013.01);
(Continued)

(58) Field of Classification Search
CPC ......... H01M 8/04149; H01M 8/04835; H01M 8/04141; H01M 8/04843; H01M 8/04828; H01M 8/04126; H01M 2250/20; B01D 2313/10; B01D 63/082; B01D 63/084; B01D 63/085
See application file for complete search history.

(56) References Cited

U.S. PATENT DOCUMENTS 8,091,868 B2    1/2012  Robb et al.
2006/0112827 A1*  6/2006  Okada .................. B01D 63/085
                                                            96/9
(Continued)

FOREIGN PATENT DOCUMENTS

CN        106784929 A       5/2017
DE   11 2012 000 477 T5    10/2013
(Continued)

*Primary Examiner* — Ula C Ruddock
*Assistant Examiner* — Matthew W Van Oudenaren
(74) *Attorney, Agent, or Firm* — Seed IP Law Group LLP

(57) ABSTRACT

A humidifier is provided having a humidifier module which is arranged between end plates and has a steam-permeable membrane, wherein on each of the two sides of the membrane, a flow field frame having a plurality of bridges defining a flow field is arranged, and between each flow field frame and the membrane a seal is arranged. A motor vehicle with a fuel cell device having a humidifier is also provided.

8 Claims, 5 Drawing Sheets

(52) U.S. Cl.
CPC ....... *B01D 63/085* (2013.01); *H01M 8/04126* (2013.01); *H01M 8/04828* (2013.01); *H01M 8/04835* (2013.01); *H01M 8/04843* (2013.01); *H01M 2250/20* (2013.01)

(56) References Cited

U.S. PATENT DOCUMENTS

2006/0134474 A1* 6/2006 Toth .................. H01M 8/04149
429/414
2006/0154117 A1* 7/2006 Toro ................... H01M 8/2457
429/413

FOREIGN PATENT DOCUMENTS

| DE | 10 2013 020 503 A1 | 6/2015 |
| DE | 10 2014 017 985 A1 | 6/2016 |
| DE | 10 2016 207 906 A1 | 12/2016 |
| DE | 10 2016 014 895 A1 | 7/2017 |
| DE | 10 2016 200 410 A1 | 7/2017 |
| EP | 1 261 992 B1 | 5/2011 |
| WO | 2018/055129 A1 | 3/2018 |

* cited by examiner

HUMIDIFIER AND MOTOR VEHICLE WITH A FUEL CELL DEVICE HAVING A HUMIDIFIER

BACKGROUND

Technical Field

Embodiments of the invention relate to a humidifier with a humidifier module which is arranged between end plates and has a steam-permeable membrane.

Embodiments of the invention further relate to a motor vehicle with a fuel cell device having a humidifier.

Description of the Related Art

Humidifiers are generally employed to effect a transfer of the moisture to the drier medium in the case of two gaseous media with a different moisture content. Such gas/gas humidifiers are applied, in particular, in fuel cell devices in which air is compressed with the contained oxygen in the cathode circuit for supplying the cathode chambers of the fuel cell stack, so that relatively warm and dry compressed air is present, the moisture of which is not sufficient for use in the fuel cell stack for the membrane electrode unit. The dry air provided by the compressor for the fuel cell stack is humidified by being led past the steam-permeable membrane, the other side of which is coated with the moist exhaust air from the fuel cell stack.

DE 10 2014 017 985 A1 discloses to utilize several humidifier modules arranged in series in order to increase the efficiency of the humidifier, this plurality of humidifier modules being stacked to form a stack that is held together by tightening straps that are associated with spring elements acting in the direction of the stack, in order to be able compensate for changes in length due to temperature changes.

EP 1 261 992 B1 shows a humidifier with a plurality of humidifier modules which are arranged between end plates which carry connections for the supply and discharge of the media.

DE 10 2016 207 906 A1 refers to a humidifier with a separator plate having at least one measuring structure formed integrally with the plate, which, in simple manner, can be localized for measurement of the plate.

For sufficient moistening, the known humidifiers require a large design with a correspondingly high cost of materials, wherein a bonding is generally carried out, and thus it is also associated with a high production cost and a lack of the ability to disassemble it that does not allow repair.

BRIEF SUMMARY

For a humidifier of the type mentioned above, the cost of materials for manufacturing the humidifier can be reduced as a result of more efficient humidification. An improved motor vehicle with a fuel cell device having a humidifier may also be provided.

A humidifier unit may be provided with the sequence: flow field frame—seal-membrane-seal-flow field frame, wherein a flow field is generated as a result of the bridges arranged in the flow field frame, which flow field allows a more uniform brushing of the membrane with the medium associated with this side, so that the membrane provided can be used more efficiently on both sides for an improved moisture transfer. The bridges also serve as spacers that support the membrane and thus provide improved mechanical stability.

It may also be advantageous if the humidifier module is provided several times, as this provides a scalability of the performance of the humidifier in a simple manner by the number of humidifier modules and thus different sizes of the humidifier may be provided flexibly.

In this case, it is then provided that any two of the humidifier modules are combined to form a pair of modules, and that the flow field frames for the identical medium are arranged on the side facing each other, that is to say, that by this simple measure it is prevented, that in a stack arrangement of the humidifier modules flow fields for different media are in direct contact, without a membrane separating the flow fields.

In addition, the configuration is chosen in such a way that the flow field frame and the bridges have the same height extension so that a distribution of the medium introduced in the flow field frame takes place between the individual bridges, and this distribution is maintained, that is to say, a mixing of the medium in the manner of a turbulent flow is avoided.

Alternatively, there is also the possibility that the flow field frame is formed integrally with the bridges and two distributors associated with two diametrically opposite corners, in which passage openings are formed which lead between the bridges which extend parallel to the straight line connecting the opposite corners in the central region of the flow field frame. This embodiment can be designed for injection molding, that is to say, the flow field frames on each of the two sides of the membrane can be produced economically by means of injection molding, since only a rotation of the identical flow field frames by 90 degrees must be carried out. In this case, seals can be inserted separately or sprayed on. For square flow field frames, the flow channels between the bridges are arranged at an angle of 45 degrees with respect to the legs of the flow field frame which contributes to a cross flow with an optimum flow.

In the flow field frame on both sides of the bridges, in each case a connector positioning the bridges can be arranged with lower height extension with respect to the bridges, which is connected on the inside of the flow field frame at right angles with two adjacent legs. This connector thus creates in a simple manner the possibility, due to its low height extension, that a supply of the medium can take place in the corner as a collector and from there the distribution of the medium between the individual bridges in the flow field frame can take place for the generation of the flow field.

It is also provided that the seals are configured as a sealing frame with two opposite cross connectors, which are connected on the inside of the sealing frame at right angles with two adjacent legs in such a way, that on one side of the membrane, the connectors and the cross connectors are associated with complementary corners, and that the membrane has the shape of a hexagon, the edges of which are associated with the connectors, the cross connectors and the frames. This arrangement creates precisely separated media spaces that are sealed against each other so that the selected corners can be utilized as collectors for the supply of one or the other medium and the seals thus ensure gas tightness between the two media and to the outside.

It should be noted further that media connections for the supply and discharge of the two media are provided, and that the media connections for one of the media are arranged jointly on one of the end plates or separately on the two end plates, and that the media connections for the other medium are arranged jointly on the same or the other end plate as the media connections for the first medium, or separately on the two end plates with inverted association of the media connections for the supply and discharge relative to the first medium. These alternative configuration options result in a large variability with respect to the flows in the flow field, enabling Z-flow and U-flow for each of the media, and counter-current flow and cross-counter-current flow when the two media are considered together.

It is also possible that the course of the bridges is offset by an angle on both sides of the membrane. This angle may be in particular 90°, so that the course of the bridges in the flow field frames for the two different media matches the different feed from the collectors of the various corners.

The humidifiers described herein are particularly advantageous when arranged in a fuel cell device operated in a motor vehicle because, as a result of the flexible size, it can be adjusted individually according to the application.

BRIEF DESCRIPTION OF THE SEVERAL VIEWS OF THE DRAWINGS

Further advantages, features, and details of embodiments of the invention result from the claims, the following description, and with reference to the drawings.

DETAILED DESCRIPTION

Figure 1:
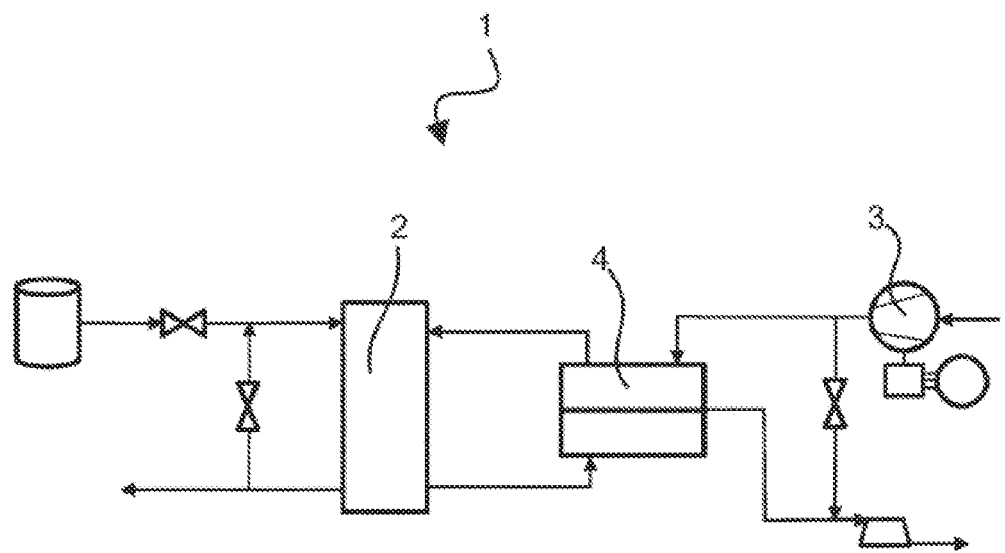
FIG. 1 shows a schematic illustration of a fuel cell device having a humidifier.

FIG. 1 shows the part of a fuel cell device 1, the fuel cell device 1 comprising an apparatus for controlling moisture of a plurality of fuel cells combined in a fuel cell stack 2.

Each of the fuel cells comprises an anode, a cathode and a proton-conductive membrane separating the anode from the cathode. The membrane is formed from an ionomer, such as a sulfonated tetrafluoroethylene polymer (PTFE) or a polymer of perfluorinated sulfonic acid (PFSA). Alternatively, the membrane can be formed as a hydrocarbon membrane.

A catalyst can also be added to the anodes and/or the cathodes, the membrane being coated on its first side and/or on its second side with a catalyst layer made of a noble metal or a mixture comprising noble metals such as platinum, palladium, ruthenium or the like that serve as a reaction accelerator in the reaction of the respective fuel cell.

The anode can be supplied with fuel (e.g., hydrogen) via an anode compartment. In a polymer electrolyte membrane fuel cell (PEM fuel cell), fuel or fuel molecules are split into protons and electrons at the anode. The PEM lets the protons pass through, but is impermeable to the electrons. For example, the following reaction takes place at the anode: $2H_2 \rightarrow 4H^+ + 4e^-$ (oxidation/electron release). While the protons pass through the PEM to the cathode, the electrons are conducted to the cathode or an energy storage system via an external circuit.

The cathode gas (e.g., oxygen or air containing oxygen) can be supplied to the cathode via a cathode compartment, so that the following reaction takes place on the cathode side: $O_2 + 4H^+ + 4e^- \rightarrow 2H_2O$ (reduction/electron uptake).

In order to ensure ion conductivity for hydrogen protons by the PEM, the presence of water molecules in the PEM is necessary. Therefore, in particular, the cathode gas is humidified before it is supplied to the fuel cell to bring about a moisture saturation of the PEM.

Since several fuel cells are combined in the fuel cell stack 2, a sufficiently large amount of cathode gas must be made available so that a large cathode gas mass flow is provided by a compressor 3, the temperature of which increasing greatly as a result of the compression of the cathode gas. The conditioning of the cathode gas, that is to say its setting with regard to the parameters desired in the fuel cell stack 2, takes place in a charge air cooler and in a humidifier 4.

Figure 3:
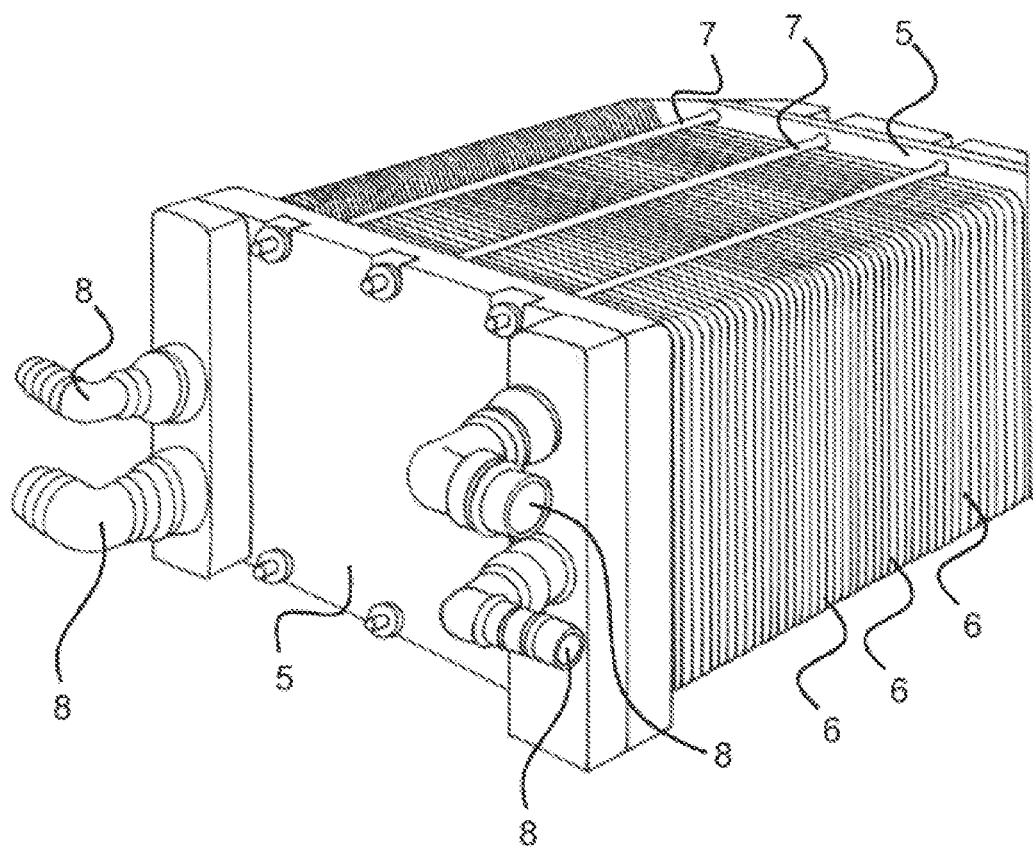
FIG. 3 shows a humidifier with a plurality of humidifier modules arranged between end plates having media connections.

The humidifier 4 shown in FIG. 3 as exemplary embodiment, has two end plates 5, between which a plurality of humidifier modules 6 is arranged, wherein the humidifier modules 6 are clamped between the end plates 5 by tie rods 7. Instead of the tie rods 7, another connection of the end plates 5 by utilizing, for example, tapes is also conceivable. It is also conceivable to associate resilient elements for a variable clamping force to compensate for expansion effects of the tie rods 7 or with the tapes. In the exemplary embodiment shown, the association of the media connections 8 for the supply and discharge of the two media with one of the end plates 5 is made for the sake of simplicity of representation, wherein in the case of a fuel cell device 1 the two media differ only in terms of their moisture content, but in terms of substance air is generally present. In general, however, there is the possibility that the media connections 8 for one of the media are arranged jointly on one of the end plates 5, or separately on the two end plates 5, and that the media connections 8 for the other medium are arranged jointly on the same or the other end plate 5 as the media connections 8 for the first medium, or separately on the two end plates 5 with inverted association of the media connections 8 for the supply and discharge relative to the first medium, that is to say that a medium can flow through the humidifier modules 6 in a U-shape or a Z-shape while when viewing the two media jointly, a counter-current or cross-counter-current is also possible.

Figure 2:
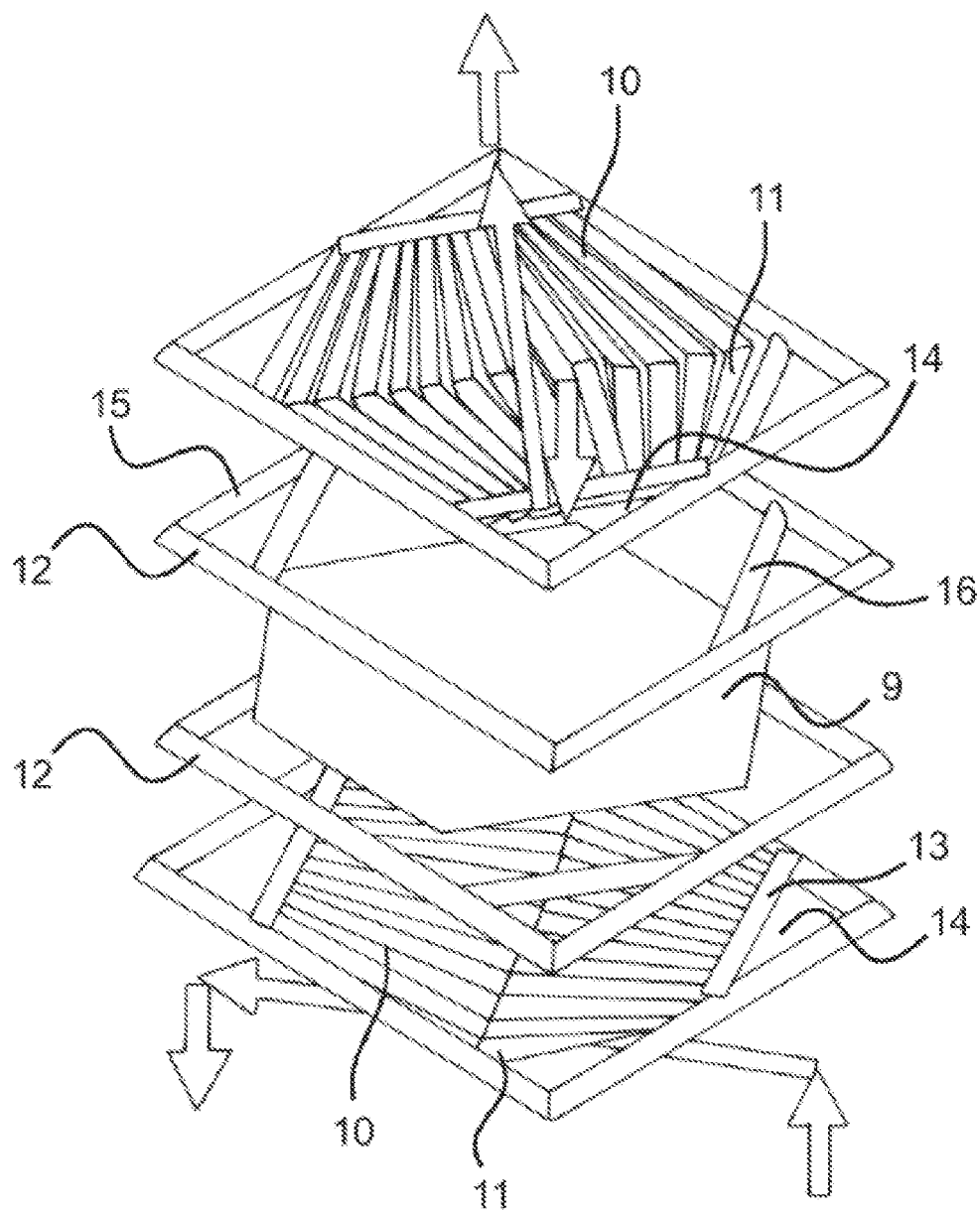
FIG. 2 shows an exploded view of a humidifier module in the sequence: flow field frame-seal-membrane-seal-flow field frame.

FIG. 2 illustrates the structure of an individual humidifier module 6. In this case, on each of the two sides of the membrane 9 a flow field frame 10 having a plurality of bridges 11 defining a flow field is arranged and between each flow field frame 10 and the membrane 9 a seal 12 is arranged in such a way that a sequence flow field frame 10-seal 12-membrane 9-seal 12-flow field frame 10 results for the unit of a humidifier module.

In this case, the flow field frame 10 and the bridges 11 have the same height extension, while in the flow field frame 10, on each of the two sides of the bridges 11, in each case a connector 13 positioning the bridges 11 is arranged with lower height extension with respect to the bridges 11, which is connected on the inside of the flow field frame 10 at right angles with two adjacent legs. Thus, this connector 13 provides a collector 14 for the medium in the corner, said medium, due to the low height extension of the connector 13, being distributed from said collector 14 between the bridges 11 to generate the flow field. Since the bridges 11 have the same height as the flow field frame 10, an exchange of the medium between the bridges 11 is not possible and there is a uniform distribution of the medium in the flow field over the entire surface of the membrane 9. Because the bridges 11 continue to have the same height as the flow field 10, the bridges 11 also effect a support of the membrane 9 and an increase in the mechanical stability of the entire humidifier module 6.

The seals 12 are configured as a sealing frame 15 with two opposite cross connectors 16, which are connected on the inside of the sealing frame 15 at right angles with two adjacent legs, wherein, on one side of the membrane 9, the connectors 13 and the cross connectors 16 are associated with complementary corners and wherein the membrane 9 has the shape of a hexagon, the edges of which are associated with the connectors 11, the cross connectors 13 and the frames 10, 15.

FIG. 2 thus shows that, in the lower flow field frame 10 shown in FIG. 2, supplying the moist medium can take place in the right corner, which is channeled between the bridges 11 via the connector 13 and can exit the flow field and the flow field frame 10 via the opposite corner. In the upper flow field frame 10 shown in FIG. 2, the course of the bridges 11 is offset by an angle of 90° relative to the course of the bridges 11 in the lower flow field frame 10. The connector 13 in the upper flow field frame 10 in turn creates the possibility for supplying the dry medium between the bridges 11 and discharging the dry medium between the bridges 11 from the opposite corner of the upper flow field frame 10.

It should be noted that, as a result of the cross connectors 16 associated with the sealing frame 15, a gas tightness is provided between the two media and also to the outside. In the humidifier modules 6 arranged in series between the end plates 5, there are consequently separate supply channels and discharge channels for the two media.

Figure 4:
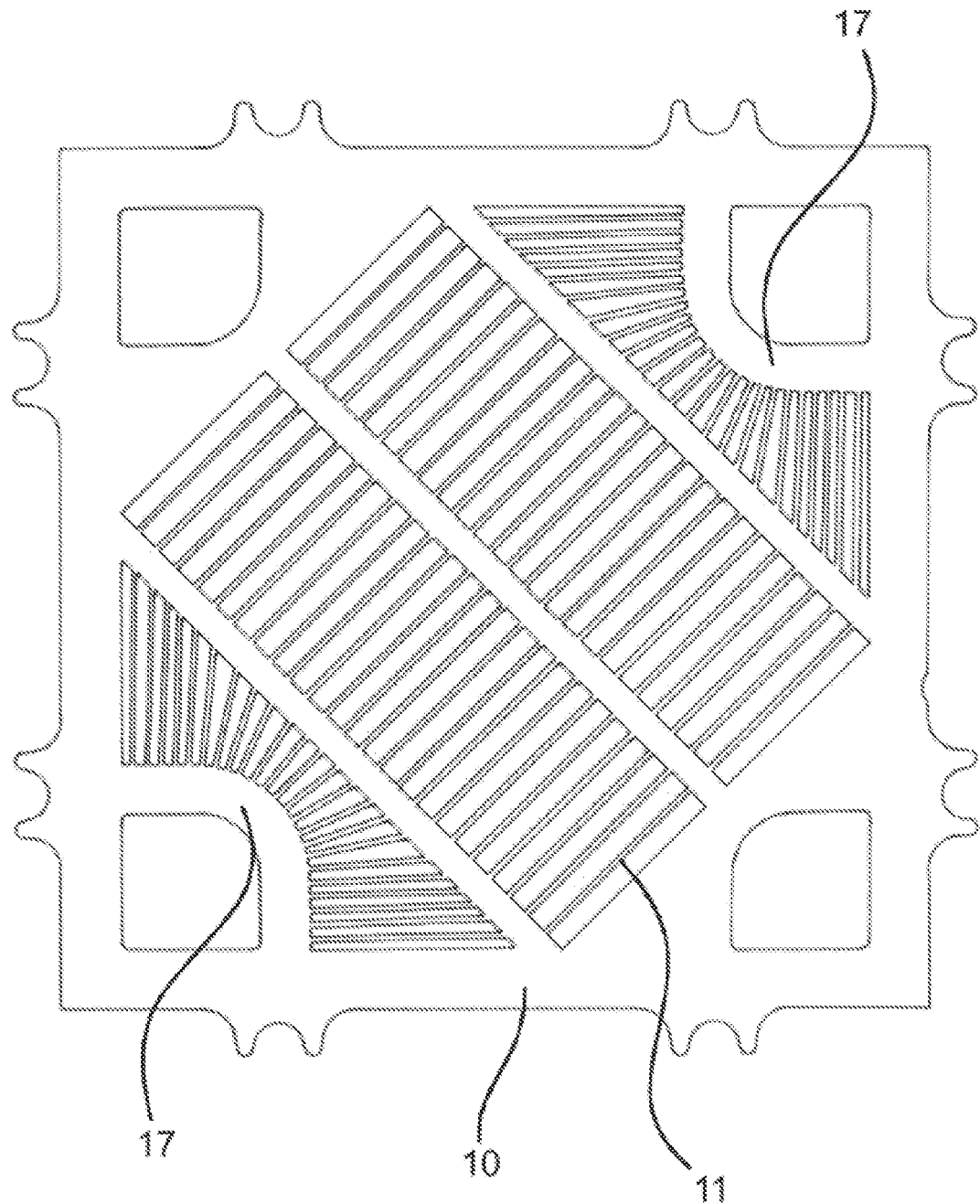
FIG. 4 shows an alternative embodiment of a flow field frame in a plan view.
Figure 5:
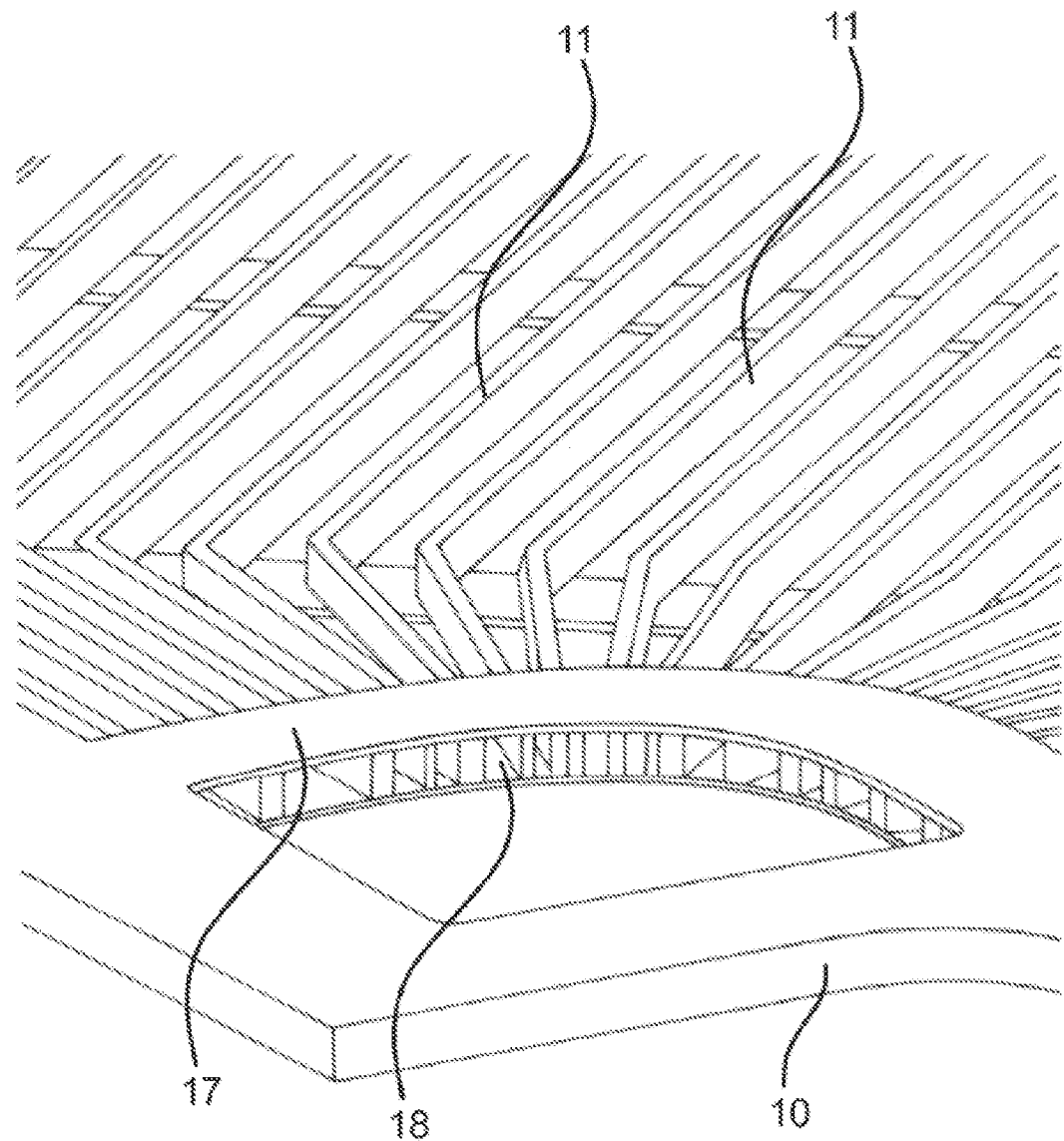
FIG. 5 shows a perspective illustration of a corner of the flow field frame from FIG. 4.

FIGS. 4 and 5 show an alternative configuration of the flow field frame 10, in which the flow field frame 10 is formed integrally with the bridges 11 and two distributors 17 associated with diametrically opposite corners, in which passage openings 18 are formed that lead between the bridges 11, which extend parallel to the straight line connecting the opposite corners in the central region of the flow field frame 10. In the case of the square basic shape shown, the flow channels between the bridges 11 are thus arranged at an angle of 45 degrees with respect to the legs, that is to say rotated.

The humidifier module 6 as one unit can be sealed outwardly as a whole in the region of the bridges 11, alternatively, it is also possible that two of the humidifier modules 6 are combined to form a pair of modules, and that the flow field frames 10 for the identical medium are arranged on the side facing each other in such a way that identically made humidifier modules 6 can be arranged in series, without the possibility of any exchange between the flow field frame 10 for the moist medium and the adjacent flow field frame 10 for the dry medium.

The flow field frame 10 can be made of a suitable plastic such as, for example, PEEK.

The seal 12 can be configured as an insert seal, for which materials such as PTFE or EPDM are suitable.

For the membrane 9, the utilization of polymer membranes, such as, for example, sulphonated membranes is conceivable; cotton membranes are also suitable.

The fuel cell device 1 with the humidifier 6 is particularly suitable for use in a motor vehicle.

Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A humidifier, comprising:
   a humidifier module arranged between end plates, the humidifier module including:
     a steam-permeable membrane;
     a first flow field frame having a first plurality of bridges defining a first flow field arranged on a first side of the membrane, each of the first plurality of bridges having a first end, a second end opposite to the first end, and a first height in a stack direction of the humidifier, wherein the first flow field frame includes a first connector at a first interior corner of the first flow field frame and a second connector at a second interior corner of the first flow field frame, wherein the first connector positions the first ends of the first plurality of bridges and the second connector positions the second ends of the first plurality of bridges, and wherein the first and second connectors of the first flow field frame have heights in a stack direction of the humidifier smaller than the first height;
     a second flow field frame having a second plurality of bridges defining a second flow field arranged on a second side the membrane opposite to the first side of the membrane, each of the second plurality of bridges having a first end, a second end opposite to the first end, and a second height in a stack direction of the humidifier, wherein the second flow field frame includes a first connector at a first interior corner of the second flow field frame and a second connector at a second interior corner of the second flow field frame, wherein the first connector positions the first ends of the second plurality of bridges and the second connector positions the second ends of the second plurality of bridges, and wherein the first and second connectors of the second flow field frame have heights in a stack direction of the humidifier smaller than the second height;
     a first seal arranged between the first flow field frame and the membrane, wherein the first seal comprises a first sealing frame including a first cross connector at a first interior corner of the first sealing frame and a second cross connector at a second interior corner of the first sealing frame opposite the first interior corner of the first sealing frame; and
     a second seal arranged between the second flow field frame and the membrane, wherein the second seal comprises a second sealing frame including a first cross connector at a first interior corner of the second sealing frame and a second cross connector at a second interior corner of the second sealing frame opposite the first interior corner of the second sealing frame, wherein the first and second interior corners of the second sealing frame are complementary to the first and second interior corners of the second flow field frame, and
   wherein the steam-permeable membrane has an overall hexagonal shape having edges associated with locations of the connectors, the cross connectors, the flow field frames, and the sealing frames.

2. The humidifier according to claim 1, wherein the humidifier includes a plurality of humidifier modules.

3. The humidifier according to claim 2, wherein the plurality of humidifier modules includes a first humidifier module and a second humidifier module, the first humidifier module having a first flow field frame for a first reactant and a second flow field frame for a second reactant, and the second humidifier module having a first flow field frame for the first reactant and a second flow field frame for the second reactant, and wherein the first flow field frames for the first reactant face each other such that the second flow field frames are not in direct contact with the first flow field frames and such that a membrane separates each of the first flow field frames from each of the second flow field frames.

4. The humidifier according to claim 1, wherein each flow field frame and its respective bridges have the same height extension.

5. The humidifier according to claim 1, wherein each flow field frame is formed integrally with its respective bridges and two distributors associated with diametrically opposite corners, in which passage openings are formed which lead between the bridges which extend parallel to the straight line connecting the opposite corners in the central region of the flow field frame.

6. The humidifier according to claim 1, wherein the end plates include a first end plate and a second end plate, wherein media connections are provided for supply and discharge of first and second media, wherein the media connections for the first media are arranged jointly on the first end plate or separately on the first end plate and the second end plate, and wherein the media connections for the second media are arranged jointly on the first end plate or the second end plate, or separately on the first end plate and the second end plate, with inverted association of the media connections for the supply and discharge relative to the first media.

7. The humidifier according to claim 1, wherein the course of the bridges on each of the two sides of the membrane is offset by an angle.

8. A motor vehicle with a fuel cell device having a humidifier comprising:
 a humidifier module arranged between end plates, the humidifier module including:
  a steam-permeable membrane;
  a first flow field frame having a first plurality of bridges defining a first flow field arranged on a first side of the membrane, each of the first plurality of bridges having a first end, a second end opposite to the first end, and a first height in a stack direction of the humidifier, wherein the first flow field frame includes a first connector at a first interior corner of the first flow field frame and a second connector at a second interior corner of the first flow field frame, wherein the first connector positions the first ends of the first plurality of bridges and the second connector positions the second ends of the first plurality of bridges, and wherein the first and second connectors of the first flow field frame have heights in a stack direction of the humidifier smaller than the first height;
 a second flow field frame having a second plurality of bridges defining a second flow field arranged on a second side the membrane opposite to the first side of the membrane, each of the second plurality of bridges having a first end, a second end opposite to the first end, and a second height in a stack direction of the humidifier, wherein the second flow field frame includes a first connector at a first interior corner of the second flow field frame and a second connector at a second interior corner of the second flow field frame, wherein the first connector positions the first ends of the second plurality of bridges and the second connector positions the second ends of the second plurality of bridges, and wherein the first and second connectors of the second flow field frame have heights in a stack direction of the humidifier smaller than the second height;
 a first seal arranged between the first flow field frame and the membrane, wherein the first seal comprises a first sealing frame including a first cross connector at a first interior corner of the first sealing frame and a second cross connector at a second interior corner of the first sealing frame opposite the first interior corner of the first sealing frame; and
 a second seal arranged between the second flow field frame and the membrane, wherein the second seal comprises a second sealing frame including a first cross connector at a first interior corner of the second sealing frame and a second cross connector at a second interior corner of the second sealing frame opposite the first interior corner of the second sealing frame, wherein the first and second interior corners of the second sealing frame are complementary to the first and second interior corners of the second flow field frame, and
 wherein the steam-permeable membrane has an overall hexagonal shape having edges associated with locations of the connectors, the cross connectors, the flow field frames, and the sealing frames.

* * * * *